United States Patent
McMurtry et al.

[11] Patent Number: 6,145,405
[45] Date of Patent: Nov. 14, 2000

[54] COORDINATE POSITIONING MACHINE

[75] Inventors: David R McMurtry; Nicholas A. James, both of Wotton-Under-Edge, United Kingdom

[73] Assignee: Renishaw PLC, Wotton-Under-Edge, United Kingdom

[21] Appl. No.: 09/161,284

[22] Filed: Sep. 28, 1998

Related U.S. Application Data

[63] Continuation of application No. 08/685,097, Jul. 22, 1996, Pat. No. 5,813,287, which is a continuation-in-part of application No. 08/396,721, Mar. 1, 1995, abandoned.

[30] Foreign Application Priority Data

| Mar. 2, 1994 | [GB] | United Kingdom | 9403957 |
| Sep. 15, 1994 | [GB] | United Kingdom | 9418587 |
| Dec. 21, 1994 | [GB] | United Kingdom | 9425887 |

[51] Int. Cl.⁷ ............... B25J 18/00; B25J 11/00
[52] U.S. Cl. ............... 74/490.07; 74/490.01; 901/16; 901/29; 901/19
[58] Field of Search ............... 74/479.01, 490.01, 74/490.03, 490.07, 490.08, 490.06; 901/19, 14, 15, 16, 22, 23, 28, 29; 248/653, 654

[56] References Cited

U.S. PATENT DOCUMENTS

| 4,536,690 | 8/1985 | Belsterling et al. | 318/687 |
| 4,569,627 | 2/1986 | Simunovic | 901/14 X |
| 4,732,525 | 3/1988 | Neumann | 414/729 |
| 4,790,718 | 12/1988 | Vickers | 414/735 |
| 4,806,068 | 2/1989 | Kohli et al. | 74/479.01 X |
| 4,819,496 | 4/1989 | Shelef | 74/490.03 |
| 4,976,582 | 12/1990 | Clavel | 414/729 |
| 5,156,062 | 10/1992 | Appleberry | 74/490.01 |
| 5,354,158 | 10/1994 | Sheldon et al. | 409/201 |
| 5,387,969 | 2/1995 | Marantette | 356/4.09 |
| 5,604,593 | 2/1997 | McMurtry | 356/58 |
| 5,740,699 | 4/1998 | Ballantyne et al. | 74/490.03 X |
| 5,987,726 | 11/1999 | Akeel | 74/490.06 X |

FOREIGN PATENT DOCUMENTS

| 0 503 712 A1 | 9/1992 | European Pat. Off. . |
| 0 534 585 A2 | 3/1993 | European Pat. Off. . |
| 35 04 464 C1 | 4/1986 | Germany . |
| 631329 | 11/1978 | Russian Federation . |
| 1315290 A1 | 6/1985 | Russian Federation . |
| 2 083 795 | 3/1982 | United Kingdom . |
| WO 91/03145 | 3/1991 | WIPO . |
| WO 92/17313 | 10/1992 | WIPO . |

OTHER PUBLICATIONS

G. Pfreundschuh et al., "Design and Control of a 3 DOF In–Parallel Actuated Manipulator", 1991 IEEE International Conference on Robotics and Automation, Apr. 9–11, 1991, Sacramento, California, US, pp. 1659–1664.

K–M. Lee et al., "A Three–Degrees–of–Freedom Micromotion In–Parallel Actuated Manipulator", IEEE Transactions on Robotics and Automation, Oct., 1991, vol. 7, No. 5, New York, US, pp. 634–641.

J–P. Merlet, "Direct Kinematics and Assembly Modes of Parallel Manipulators", The International Journal of Robotics Research, Apr., 1992, vol. 11, No. 2, Cambridge, MA, US, pp. 150–162.

(List continued on next page.)

*Primary Examiner*—Charles A Marmor
*Assistant Examiner*—Ankur Parekh
*Attorney, Agent, or Firm*—Oliff & Berridge, PLC

[57] ABSTRACT

A coordinate positioning machine comprises a fixed structure including a table and a supporting frame (314), rigidly connected together. A moveable arm (310) is suspended from the frame by means of three powered telescopic struts (316), each of which is universally pivotally connected to both the arm and the frame. As a consequence the moveable arm is able to move with three rotational degrees of freedom. Movement of the arm with each of these degrees of freedom is constrained by a passive device (340), connected to the arm and the fixed structure, and which eliminates all rotational movement of the arm, while simultaneously permitting translation thereof.

16 Claims, 10 Drawing Sheets

OTHER PUBLICATIONS

"One Hundred Robots Soon at the Flick of a Switch", The Engineer, Oct. 6, 1994.

"HEXAPOD—Positioning Assembly with 6 Degrees of Freedom", product brochure, Carl Zeiss Jena GmbH.

D. Stewart, "A Platform with Six Degrees of Freedom", The Institution of Mechanical Engineers, Proceedings 1965–66, vol. 180, Part 1, No. 15, pp. 371–386.

COORDINATE POSITIONING MACHINE

This is a continuation of application Ser. No. 08/685,097, filed Jul. 22, 1996, now U.S. Pat. No. 5,813,287, which in turn is a Continuation-in-Part of application Ser. No. 08/396,721, filed Mar. 1, 1995, now abandoned.

BACKGROUND OF THE INVENTION

1. Field of Invention

The invention relates to a coordinate positioning machine such as a machine tool, inspection robot, or coordinate measuring machine. Coordinate positioning machines include a table for supporting an object upon which the machine is operating, and an arm movable relative to the table, typically with three linear degrees of freedom, which carries an operating module such as a cutting tool, an inspection probe, or a welding arm, for example.

2. Description of Related Art

Conventional coordinate positioning machines support the movable arm either, in the case of a robot, by a plurality of serially mounted rotatable joints, or, in the case of a machine tool and coordinate measuring machine, on a plurality of serially mounted linear guideways. In each case the serial mounting of the movable arm results in different inertial loads on the machine when the movable arm is displaced in different directions, due to the differing number of moving machine parts which must be displaced to enable such movement. Additionally, any force applied to the moveable arm, for example via the operating module, will result in bending moments being applied to at least part of the structure which supports the arm.

In an alternative form of coordinate positioning machine, the movable arm is supported by a plurality of members, each of which is connected to the mechanical earth of the machine, such as the table, for example. Machines of this type are known from e.g. International Patent Application Nos. WO91/03145 (Kearney & Trecker) and WO92/17313 (Geodetic Machines), in European Patent Application No. 534585 (Ingersoll), and U.S. Pat. No. 4,732,525, and typically include a movable arm, supported relative to a fixed, or "earthed" structure by means of a plurality of telescopic struts. Movement of the movable arm is achieved by extension and, where appropriate, contraction of one or more of the struts. A further type of coordinate positioning machine is shown in U.S. Pat. No. 4,976,582.

SUMMARY OF THE INVENTION

The present invention provides a coordinate positioning machine having: a fixed structure; an arm, supported for movement relative to the fixed structure, upon which an operating module may be mounted; the arm being supported relative to the fixed structure by three telescopic struts, each having a motor which is actuable to increase or decrease the length of the corresponding strut; the struts being universally pivotally connected at one end to said arm, and at the other end to said fixed structure, the arm thereby possessing three rotational degrees of freedom for any given combination of lengths of the three struts; constraining means acting between the fixed structure and the arm, for constraining movement of the arm with each of said three rotational degrees of freedom to within predetermined limits, while simultaneously permitting translation of said arm with three linear degrees of freedom, and including at least one passive device which eliminates one of said rotational degrees of freedom.

In one preferred embodiment, the constraining means is entirely passive, and constrains movement of the arm with one of said rotational degrees of freedom to within predetermined limits, while eliminating movement of the arm with the remaining two rotational degrees of freedom. In a further preferred embodiment, the constraining means is entirely passive, and eliminates movement of the arms with all three rotational degrees of freedom.

Measurement of the displacement of the arm with the available degrees of freedom may be detected, to the extent desired, in any convenient manner. When rotational movement of the arm is constrained to within predetermined limits, detection of rotational displacement may be necessary depending upon the function which the machine is desired to perform. Linear displacement may, for example, be detected by laser triangulation, by transducers provided within the struts, or by the provision of a corresponding number of unpowered, or "passive" telescopic struts, universally pivotally connected to the arm and the fixed structure, and containing transducers.

One advantage of a machine according to the present invention is that of a simplified construction, due to a reduction in the number of telescopic struts employed. A further advantage relates to the comparative ease and simplicity of controlling movement of the arm in real time, due to the simple geometry of the device, i.e. movement of one plane (defined by the three points of connection of the three struts at one end) relative to another plane (defined by the three points of connection of the three struts at the other end). These advantages are not however essential for the performance of the invention, nor are they necessarily the only advantages of one or more of the embodiments described.

In an alternative embodiment two additional telescopic struts are provided, each of which is connected between a mechanical earth and a point on the movable arm remote from the mounting point of the three supporting struts, the two additional struts controlling movement of the arm about two rotational axes, thereby converting the machine to a five axis machine.

The fixed structure of the machine may be provided by a frame rigidly connected to a table of the machine, from which the supporting struts are suspended.

BRIEF DESCRIPTION OF THE DRAWINGS

Embodiments of the invention will now be described, by way of example, and with reference to the accompanying drawings in which.

DETAILED DESCRIPTION OF PREFERRED EMBODIMENTS

Figure 1:
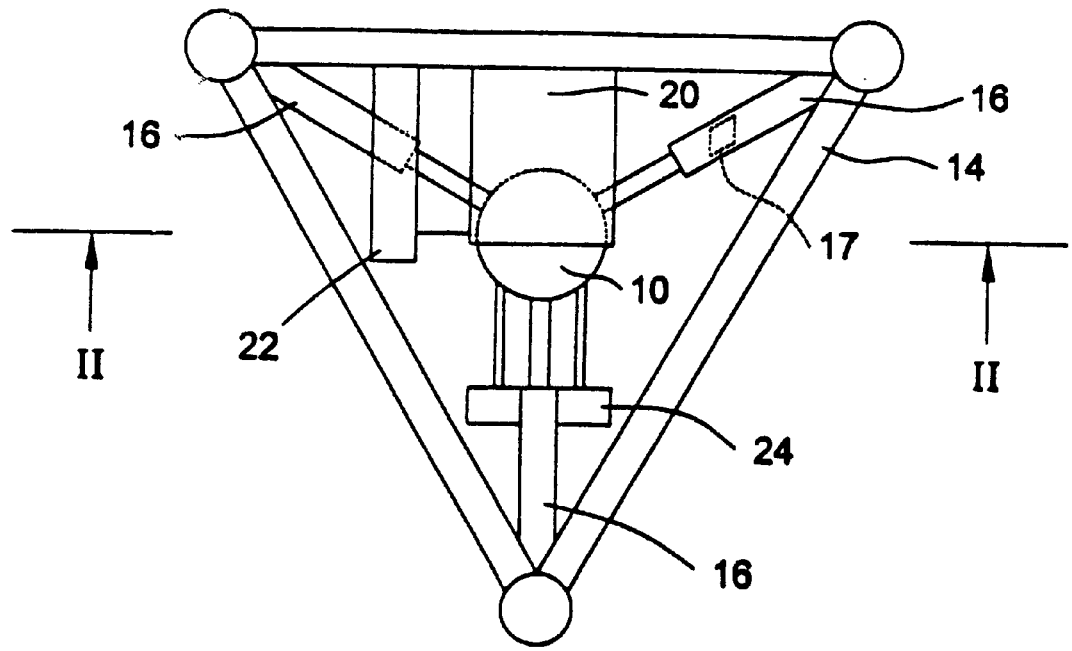
FIG. 1 shows a plan view of a first embodiment of the present invention.
Figure 2:
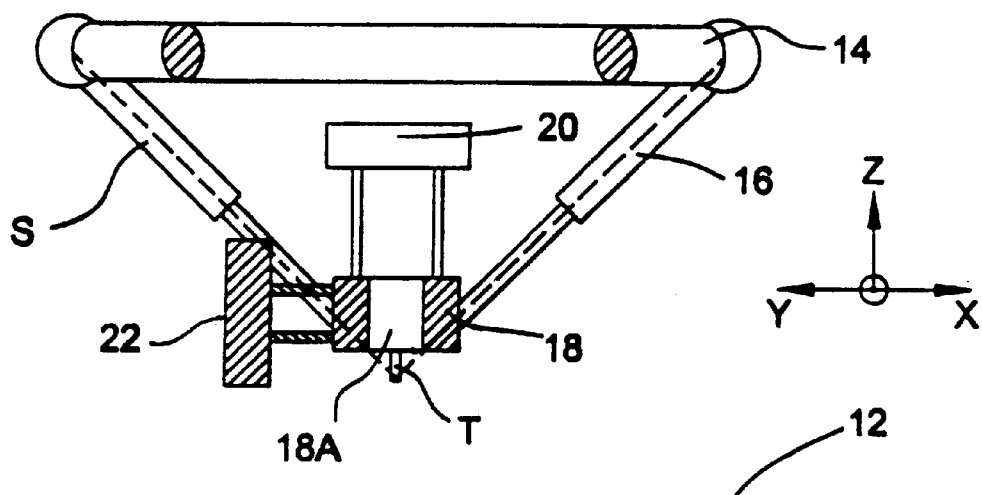
FIG. 2 shows a section on the line II—II in FIG. 1.

Referring now to FIGS. 1 and 2, a coordinate positioning machine, which in the present example is a machine tool, includes an arm or moveable structure 10 in the form of a spindle, movable relative to a table 12. The spindle 10 is suspended from a rigid triangular frame 14 by means of three powered telescopic supporting struts 16, which extend from the apexes of the triangular frame 14 to the spindle casing 18 (in which the spindle shaft 18A is journalled). The struts also contain transducers (not shown) which measure their length; the transducers may be provided for example by opto-electronic or magnetic encoders, LVDT's, or laser interferometers. The supporting frame 14 is rigidly mounted to the table 12 by a suitable structure which has been omitted here for clarity. Both structures, however, are part of the "mechanical earth" of the machine, and this is indicated throughout the specification by the usual symbol. The spindle shaft 18A carries an operating module in the form of a cutting tool T, for machining workpieces (although other operating modules may be used, such as touch trigger and analogue probes). Preferably, the geometry of the machine is such that the axes S of each of the supporting struts 16 intersect at the tool tip.

The connections of the supporting struts 16 to the frame 14 and the spindle casing 18 preferably permit universal pivotal motion of the struts 16 relative to the frame 14 and casing 18. Preferably, the connections provide substantially friction free movement, and may comprise magnets and fluid bearings. Alternatively, flexible linkages may be used. Suitable connections are disclosed in our co-pending International Patent Application No. PCT/GB94/02593. Translation of the spindle 10 is provided by expansion and/or contraction of the telescoping-supporting struts 16; e.g., a simultaneous equal contraction of all of the supporting struts 16 will cause the spindle 10 to move in a direction indicated in FIG. 2 as the Z direction, with other combinations of expansion and contraction providing movements in the X and Y directions respectively as desired.

Figure 3:
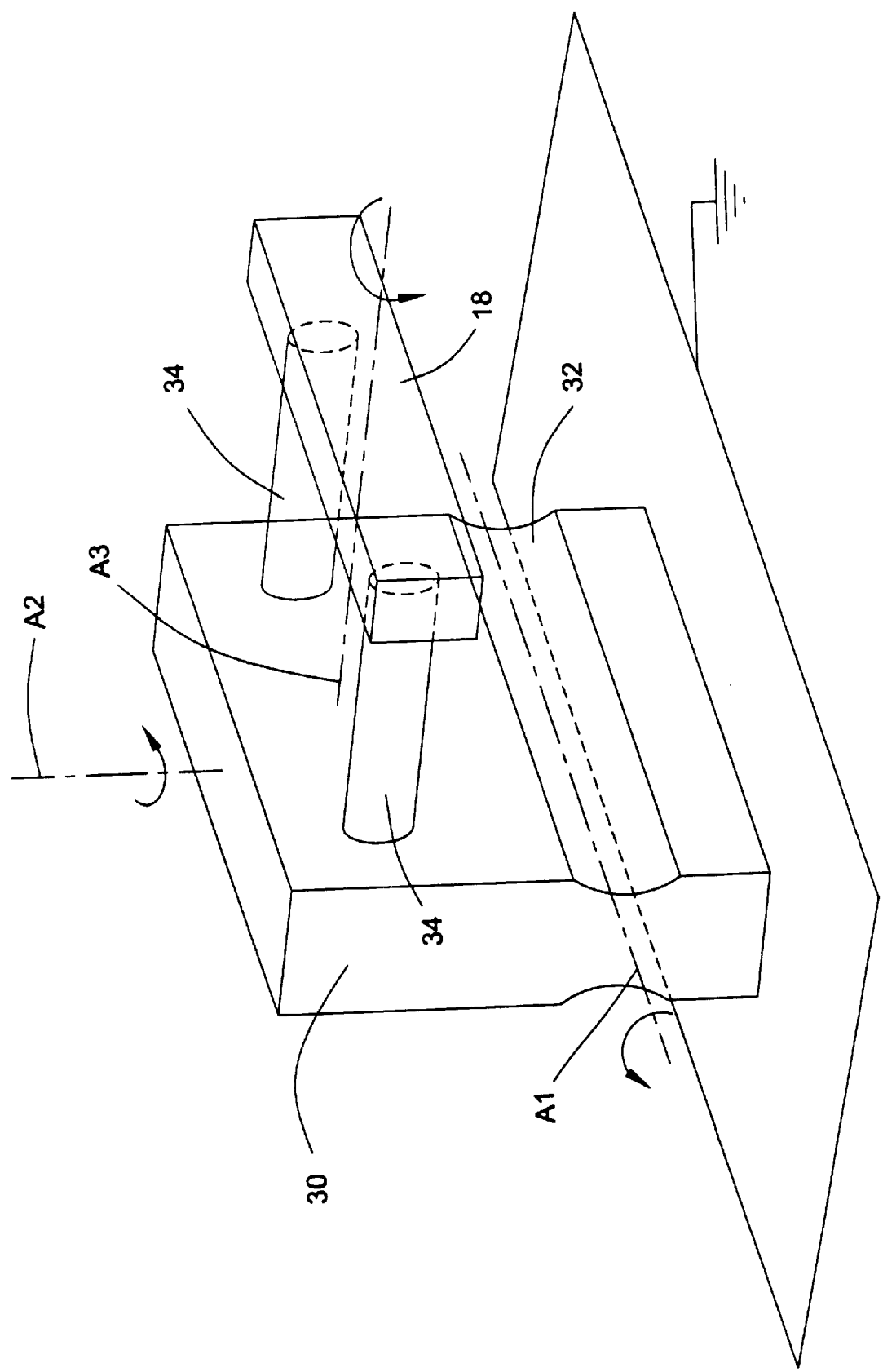
FIG. 3 shows a detail of FIGS. 1 and 2.

Because the spindle 10 is suspended by only three telescopic supporting struts 16, the spindle may, for a given combination of strut lengths, rotate about three perpendicular axes relative to the table 12 by virtue of the universal pivotal mounting of the struts 16 relative to the frame 14 and spindle casing 18. Movement of the spindle with each of these three degrees of rotational freedom is eliminated by the provision of an anti-rotation device having three mechanical linkages 20, 22, 24 which prevent rotation about the X, Y and Z axes, respectively. Each of the linkages is passive, i.e. has no motor or other actuator. One such linkage is illustrated in more detail in FIG. 3. Referring now to FIG. 3, an individual linkage includes a substantially rigid planar member 30, mounted to a mechanical earth of the machine, such as the supporting.frame 14 or the table 12. The rigid member 30 has a region of relative weakness 32 at its base, which serves as a hinge to enable tilting of the upper part of the member 30 about an axis A1. The upper end of the member 30 is connected to the spindle casing 18 by means of two elongate rods 34, which are flexible in bending but rigid in tension and compression.

The operation of an individual linkage will now be described. Translational movement of the spindle casing 18 along the axis A3 is permitted by tilting of the member 30 about axis A1, while the resultant changing angle between the rods 34, rigid member 30 and the spindle casing 18 is accommodated by flexing of the rods 34. Translational movement of the spindle casing 18 in directions parallel to either axis A1 or axis A2 is permitted by flexing of the rods 34 in a manner similar to that of a pair of parallel leaf springs. Rotation of the spindle casing 18 about an axis parallel either to the axis A1 or to the axis A2 is permitted by flexing of the rods 34. The rigidity of the rods 34 to tension and compression, together with the relative rigidity of the member 30 prevents rotation of the spindle casing 18 about an axis parallel to axis A3. An individual linkage 20, 22, 24 thus permits linear movement of the spindle casing 18 in three perpendicular directions, together with rotation thereof about two perpendicular axes, while preventing rotation about a third axis.

Referring again to FIGS. 1 and 2 it can be seen that the combined action of all three linkages 20, 22, 24 eliminates all rotational movement of the spindle 10 relative to the table 12, while permitting linear movement thereof due to telescoping of the struts 16.

In a modification of the linkage shown in FIG. 3 the planar member 30 is totally rigid, and a mechanical low-friction hinge is provided in the place of the area of weakness 32. Additionally the elongate rods 34 are replaced by stiff rods, universally pivotally connected to both the mechanical earth and the spindle casing 18. The choice of flexural or pivoting linkages depends upon a number of factors, and particularly upon the range of travel of the spindle casing 18 over which constraint, and in this particular embodiment, elimination of rotational movement of the spindle is required. Flexural linkages have the advantage of being friction and backlash free, but have the disadvantage that they are only operable over a short range; pivoting linkages are operable over a large distance, but suffer from friction and backlash.

A second embodiment of the present invention will now be described with references to FIGS. 4 and 5. A coordinate positioning machine in the form of a machine tool includes a supporting frame 114 rigidly mounted to a table (not shown). A moveable arm in the form of a spindle 110 is suspended from the frame 114 by means of three powered telescopic struts (not shown). The struts are universally pivotally connected to the frame 114 and spindle 110, thereby allowing, for any given combination of strut lengths, rotational movement of the spindle with three degrees of freedom. Movement of the spindle with two of these rotational degrees of freedom is eliminated, and movement of the spindle with a third degree of rotational freedom is constrained to within predetermined limits by an anti-rotation device provided by a linkage 140.

The linkage 140 includes a torsionally rigid box 150, mounted by a hinge to a mechanical earth 152, thereby to enable pivoting of the box 150 about axis B1. Box 150 includes top and bottom kite-shaped sub-frames 154, 156 interconnected by four vertical rods 158A, B, C, D and two angularly extending stanchions 160. Two triangular wishbone frames 162 are connected at their apexes to the upper and lower ends of vertical rod 158A by means of a suitable mounting providing universal pivotal motion thereof. The ends of the wishbone frames 162 remote from the rod 158A are connected to the spindle casing 118. The linkage thus functions in a manner similar to an elbow joint, with translation of the spindle 110 in the X and Y directions being accommodated by pivoting of the torsion box 150 about axis B1 and/or pivoting of the wishbone frames 162 about axis B2. Translation of the spindle 110 in the Z direction is accommodated by pivoting of the wishbone frames 162 as illustrated with dashed lines in FIG. 5.

The mechanical earth to which the rigid box 150 is mounted is provided at the upper end of the box by the supporting frame 114, and at its lower end by a table (not shown). When the spindle 110 occupies a position centrally within the frame 114, the rigid torsion box 150 will extend underneath one of the spars 114A of the frame 114, while the wishbones 162 will extend substantially perpendicularly thereto. The arcuate motions permitted by the hinged mounting of the rigid torsion box 150 and wishbone frames 162 are illustrated in FIG. 4, and have reference numbers C1 and C2, respectively.

This anti-rotation device has the advantage of relative simplicity when compared with the device having three individual linkages 20, 22, 24 illustrated in FIGS. 1–3. However, rotation of the wishbone frames 162 through a given angle, enabling movement of the spindle to occur along the arcuate path C2 will cause a corresponding rotation of the spindle casing 118 about an axis parallel to the Z axis. This will be insignificant compared with the relatively rapid rotation of the spindle shaft 118A relative to the casing 118. (The limits to within which rotation of the spindle casing is confined are defined by the permissible range of rotation of the wishbones 162 relative to the frame 114).

If it is desired to use this construction for a coordinate measuring machine, for example, where the permissible rotation may be significant, it may be necessary to measure the extent of rotation of the arm 110 by providing transducers which determine the angular displacement about the axes B1 and B2.

Figure 4:
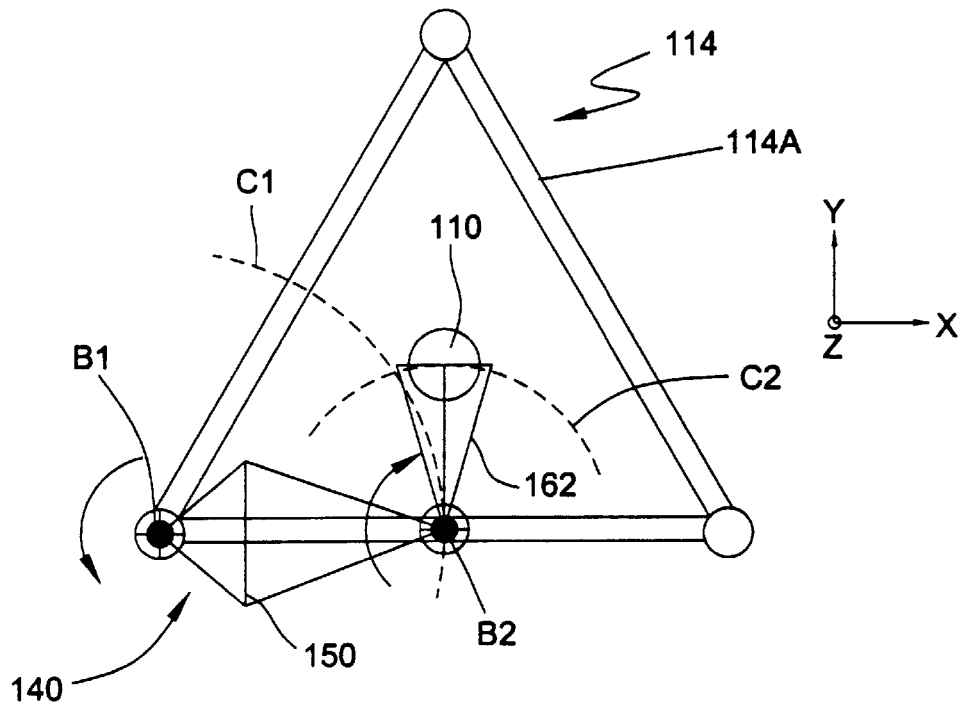
FIG. 4 is a plan view of a second embodiment of the present invention.
Figure 5:
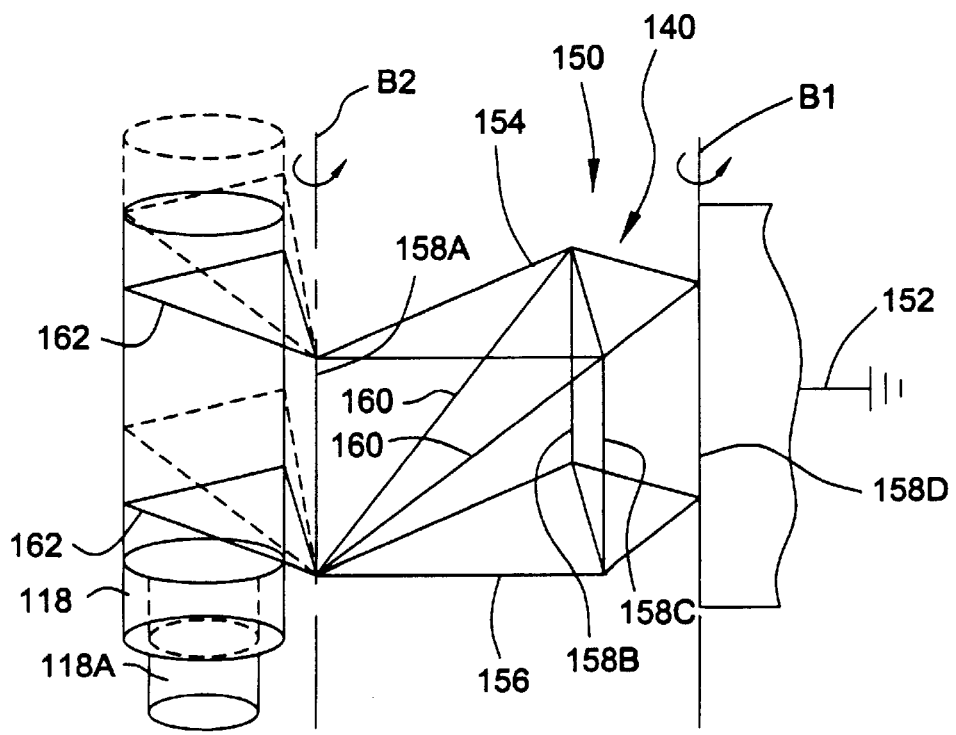
FIG. 5 is a schematic perspective view of a detail of FIG. 4.
Figure 6A:
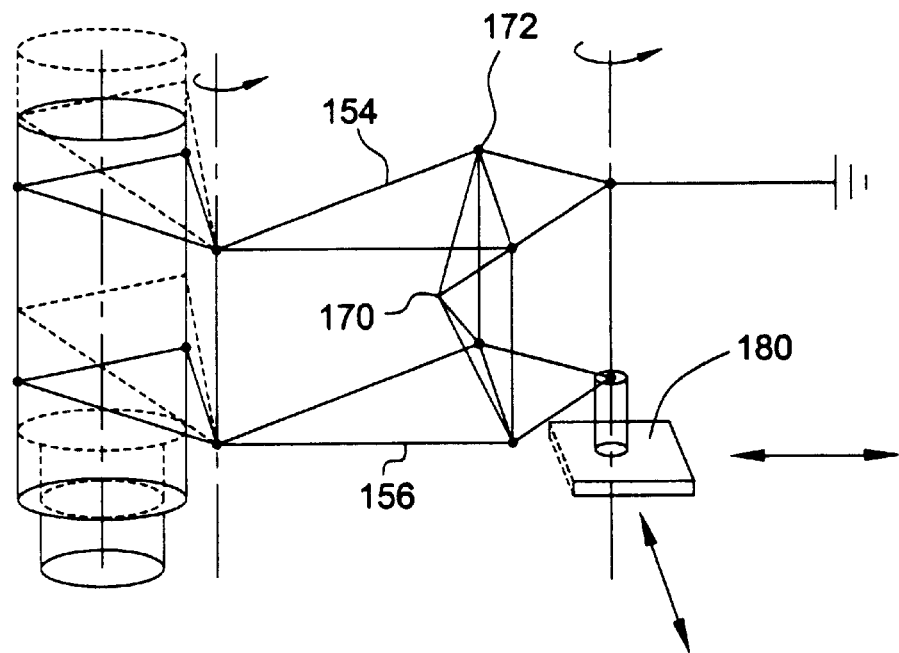
FIG. 6A and FIG. 6B are perspective views of a modification to the embodiment of FIGS. 4 and 5.
Figure 6B:
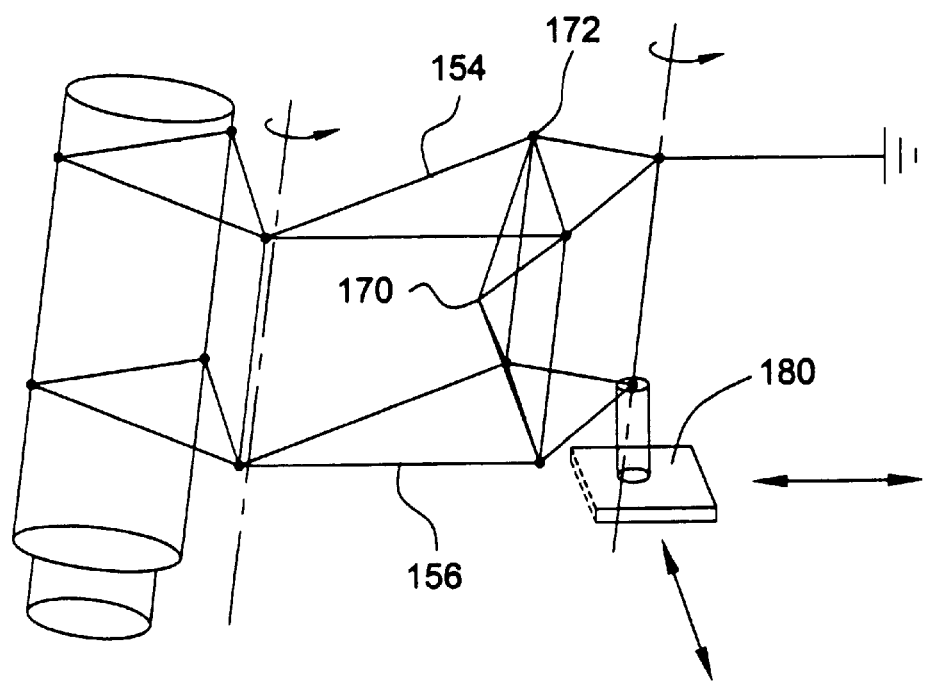

Referring now to FIGS. 6A and 6B, in a modification to the embodiments of FIGS. 4 and 5, the stanchions 160 of torsion box 150 are removed. In their place, a pyramidal, torsionally resistant sub-frame 170 is inserted in the plan of vertical rods 158B,C. The subframe is universally pivotally mounted via ball joints 172 to the top and bottom kite-shaped sub-frames 154, 156 and therefore enables relative linear movement between subframes 154, 156 and relative rotation about hinges defined by the points of connection between sub-frames 154 and 170, and 156 and 170 respectively provided by ball joints 172, but eliminates all other relative rotation and translation. Lower sub-frame 156 is universally pivotally mounted to a two-axis linear stage 180, movable with two linear degrees of freedom relative to the mechanical earth, on which upper sub-frame 154 is universally pivotally mounted. Referring specifically to FIG. 6B, movement of the two-axis stage will result in a change in the angle of orientation of the spindle casing 118. This modification has a number of applications. For example, the two-axis stage 180 may be used only during set-up of e.g. a machine tool, to ensure that the axis of the spindle casing 118 lies orthogonal to the plane of the table relative to which spindle casing 118 is movable. Alternatively, the stage 180 may be employed during normal operation of the machine, e.g. during machining, to provide two-axis rotational orientation of the tool. Alternatively, the two-axis stage 180 may be employed to ensure that the spindle casing 118 is correctly oriented relative to any given workpiece to be machined or inspected. For example, in the case of a machining operation, a workpiece may be probed in advance in order to determine the plane of, e.g. its upper surface, and subsequently the stage 180 may be actuated to adjust the axis of the spindle casing 118, such that the plane of the workpiece surface and spindle casing axis are orthogonal.

Figure 7:
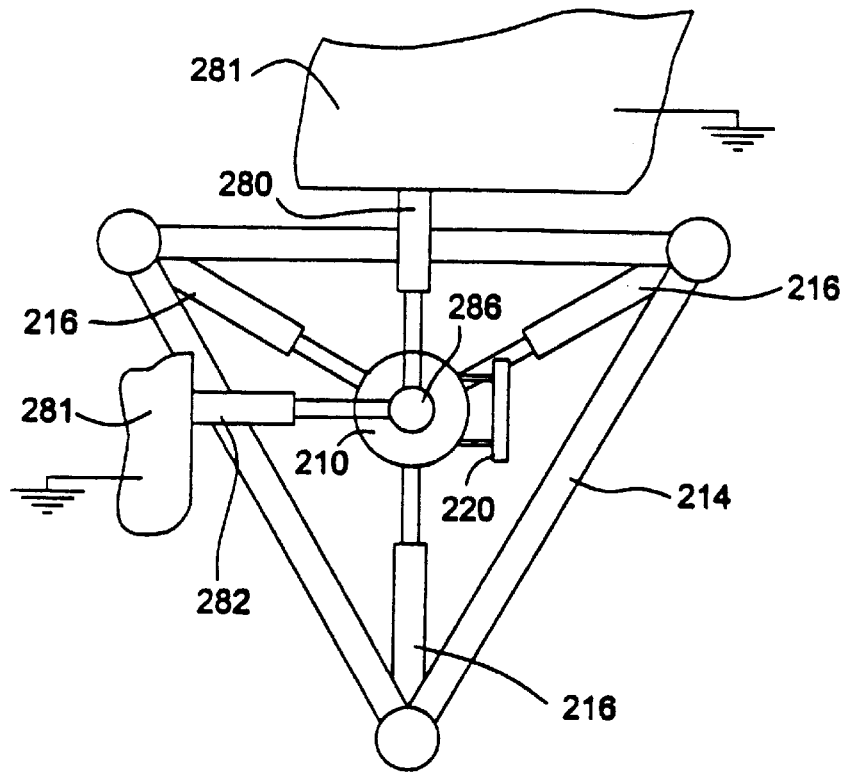
FIG. 7 is a plan view of a third embodiment of the present invention.
Figure 8:
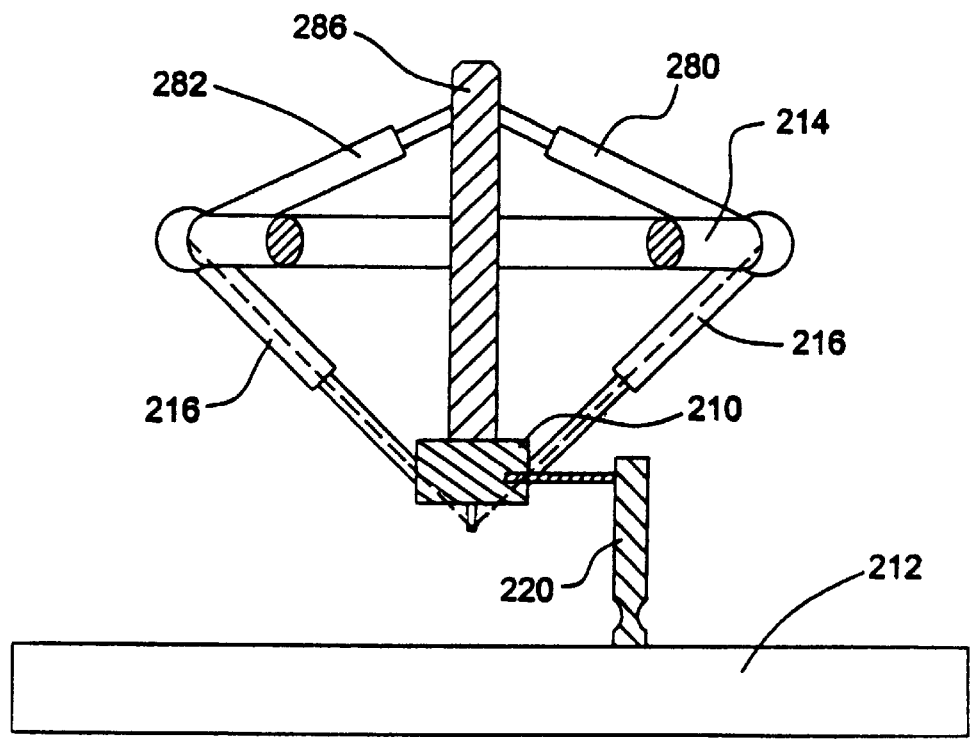
FIG. 8 is a sectional view illustrating a modification of the embodiment of FIG. 6.

A third embodiment of the present invention will now be described with reference to FIGS. 7 and 8. As with previous embodiments the machine includes a spindle 210 supported relative to a table 212 and a frame 214 by three powered telescopic universally pivotally connected struts 216. Movement of the spindle 210 with the resultant three rotational degrees of freedom. is constrained by a combination of a single passive linkage 220, of the type illustrated in FIG. 3, and a pair of powered auxiliary telescopic constraining struts 280, 282. The passive linkage 220 eliminates rotational movement of the spindle casing 218 about the Z axis. Rotational of the spindle 210 about X and Y axes is controlled by the two auxiliary struts 280, 282, which are connected at one end to a mechanical earth, and at the other end to an elongate pillar 286, whose lower end is rigidly connected to the spindle casing 218. Telescoping expansion and contraction of the auxiliary struts 280, 282 thus causes rotation of the spindle 210 about the X and Y axes. In the embodiment of FIG. 7, the auxiliary struts 280, 282 are pivotally connected to a mechanical earth distinct from the frame 214, and extend in substantially perpendicular directions. In the alternative embodiment of FIG. 8, however, the auxiliary struts 280, 282 are pivotally mounted to a mechanical earth provided by two of the apexes of the supporting frame 214. The provision of the auxiliary struts 280, 282 has the effect of converting a machine having three linear degrees of freedom to a machine with five degrees of freedom, three of which are linear and two of which are rotational.

A fourth embodiment will now be described with reference to FIGS. 9 to 11. The machine includes an arm 310 moveable relative to a table (not shown), a supporting frame 314, and three powered telescopic struts 316, universally pivotally connected at their ends to the arm 310 and the supporting structure 314, thereby supporting the arm 310 in a manner which, for a given combination of strut lengths, permits rotation of the arm 310 with three degrees of freedom.

Constraint of each of these three rotational degrees freedom is provided by a passive anti-rotation device 340, which eliminates each of these degrees of rotational freedom while permitting three dimensional translation of the arm under the action of the powered struts 316. The anti-rotation device 340 acts between a mechanical earth and the movable arm 310, and includes a linkage provided by an extensible torsion box 350, which prevents rotation of the arm 310 about two mutually orthogonal axes A, B together with an auxiliary rotational constraining linkage 360, which prevents rotation of the arm 310 about a third axis, C, extending orthogonal to both axes A and B.

Figure 10A:
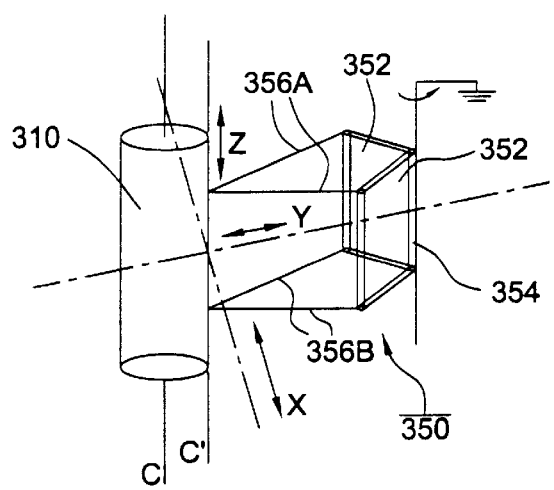
FIGS. 10A–D illustrate the operation of a first part of the constraint of FIG. 8.

Referring now to FIG. 10A, the extensible torsion box 350 includes two door members 352 each of which is mounted to the mechanically earthed structure at a common hinge 354. The movable arm 310 is connected to the door members 352 at two points spaced apart in the Z-direction by means of two pairs of V-shaped connecting rods 356A, 356B. Each of the pairs of connecting rods 356A, 356B are universally pivotally connected (e.g. by ball joints) to the movable arm at their apex, with the pairs of connecting rods 356A, 356B lying vertically in register with each other. The ends of the pairs of rods 356A, 356B remote from the point of connection with the arm 310 are universally pivotally connected to the corners of free swinging edges on door members 352.

Figure 10B:
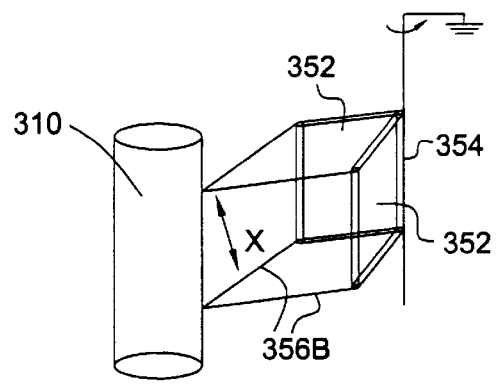
Figure 10C:
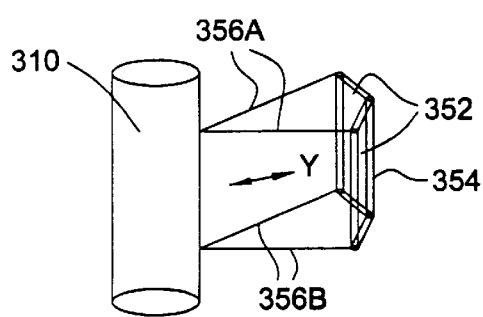
Figure 10D:
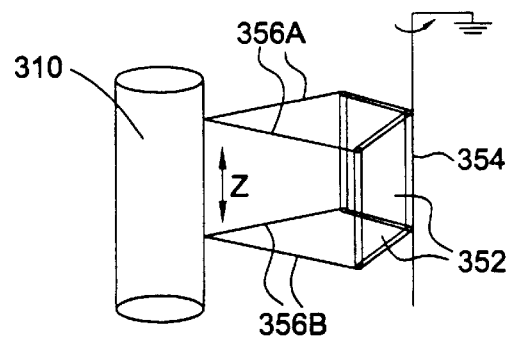

Referring now additionally to FIGS. 10B–D, the extensible torsion box 350 permits linear movement of the movable arm 310 in one or more of the directions X, Y, and Z, while simultaneously preventing rotation of the arm about rotational axes A and B. Movement in any one of the X, Y and Z directions is enabled by a combination of pivoting movements of the elements 352, and 356A, 356B relative to each other, and the mechanical earth. For example, referring now to FIG. 10B, translational movement of the movable arm 310 in the X direction is enabled by inward or outward pivoting movement of the door members 352 about hinge 354, pivoting of the connecting rods 356A, 356B relative to their points of connection with the movable arm 310 and the door members 352, and additionally a swinging movement of the door members 352, and additionally a swinging movement of the door members 352 about hinge 354. Referring now to FIGS. 10C and D, translational movement in either the Z or the Y direction is provided by a combination of either simultaneous inward or outward pivoting of the door members 352 relative to each other and about hinge 354, and pivoting movement of the connecting rods 356A, 356B about their points of connection with the movable arm 310 and the door members 352.

Figure 11A:
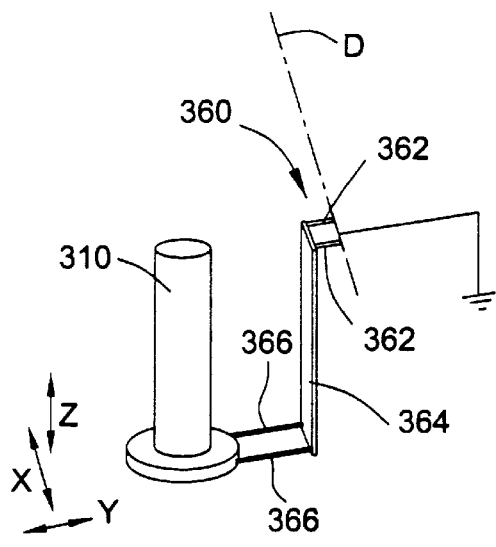
FIGS. 11A–D illustrate the operation of a second part of the constraint of FIG. 8.
Figure 11B:
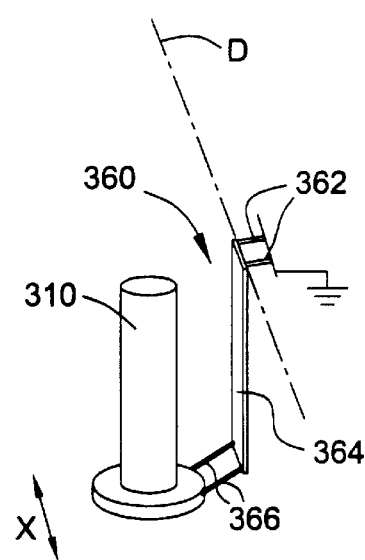
Figure 11C:
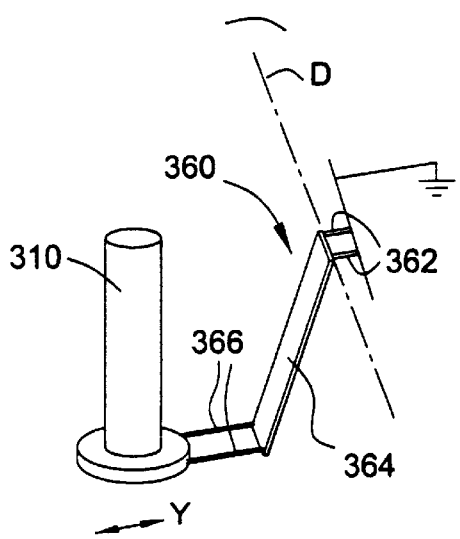
Figure 11D:
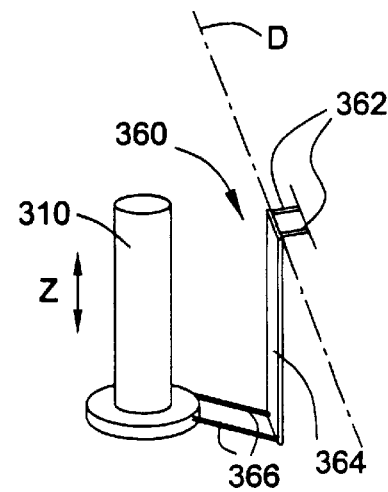

The universal pivotal connection of the rods 356A, 356B to the moveable arm 310 enables arcuate translational motion of the movable arm 310 about the axis C (on which the points of connection of the rods 356A, 356B with the arm 310 lie) and, as a result, a corresponding limited degree of rotation of the arm 310. This minor rotational freedom of the movable arm 310 is constrained by the linkage 360 illustrated in FIGS. 11A–D. Referring now to FIG. 11A, the linkage 360 includes a first pair of fixed rods 362 which are rigidly connected at one end to the mechanical earth, and are universally pivotally connected at the other by ball joints (not shown) to a further rigid door member 364. The further door member 364 is thus hinged for movement relative to the earth about an axis D. A pair of movable rods 366 are universally pivotally connected to the lower end of further door member 364 and the moveable arm 310. The rigidity of the rods 362, 366 and further door member 364 prevents rotation of the arm about the axis C, while the universal pivotal connection between the arm 310, movable rods 366, further door member 364, and fixed rods 362 allows translational motion in the X, Y and Z directions as illustrated in FIGS. 11A–D.

All rigid members of the constraining device 340 which are universally pivotally mounted, may be replaced by flexural elements, as appropriate.

Figure 9:
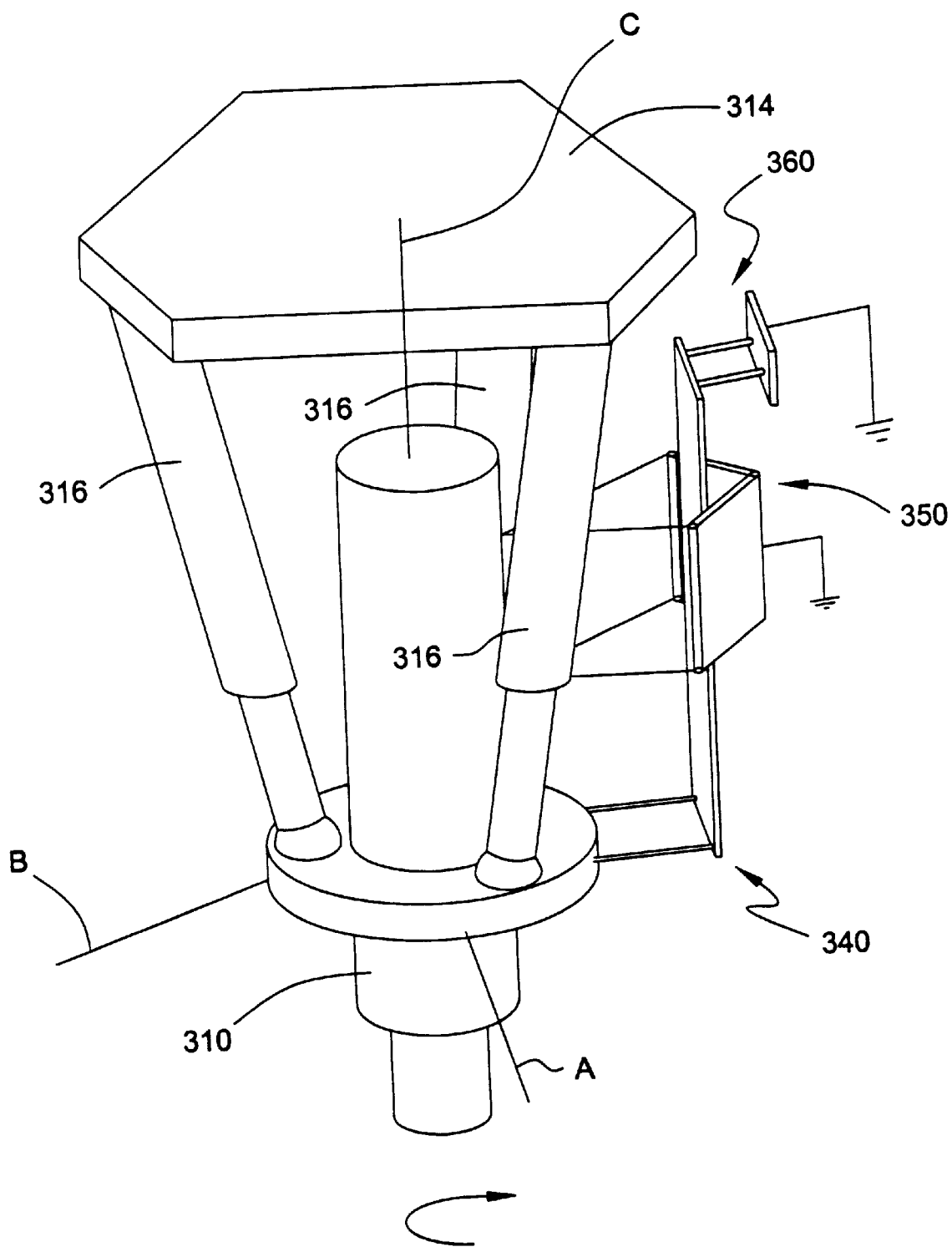
FIG. 9 is a perspective view of a fourth embodiment of the present invention.
Figure 12:
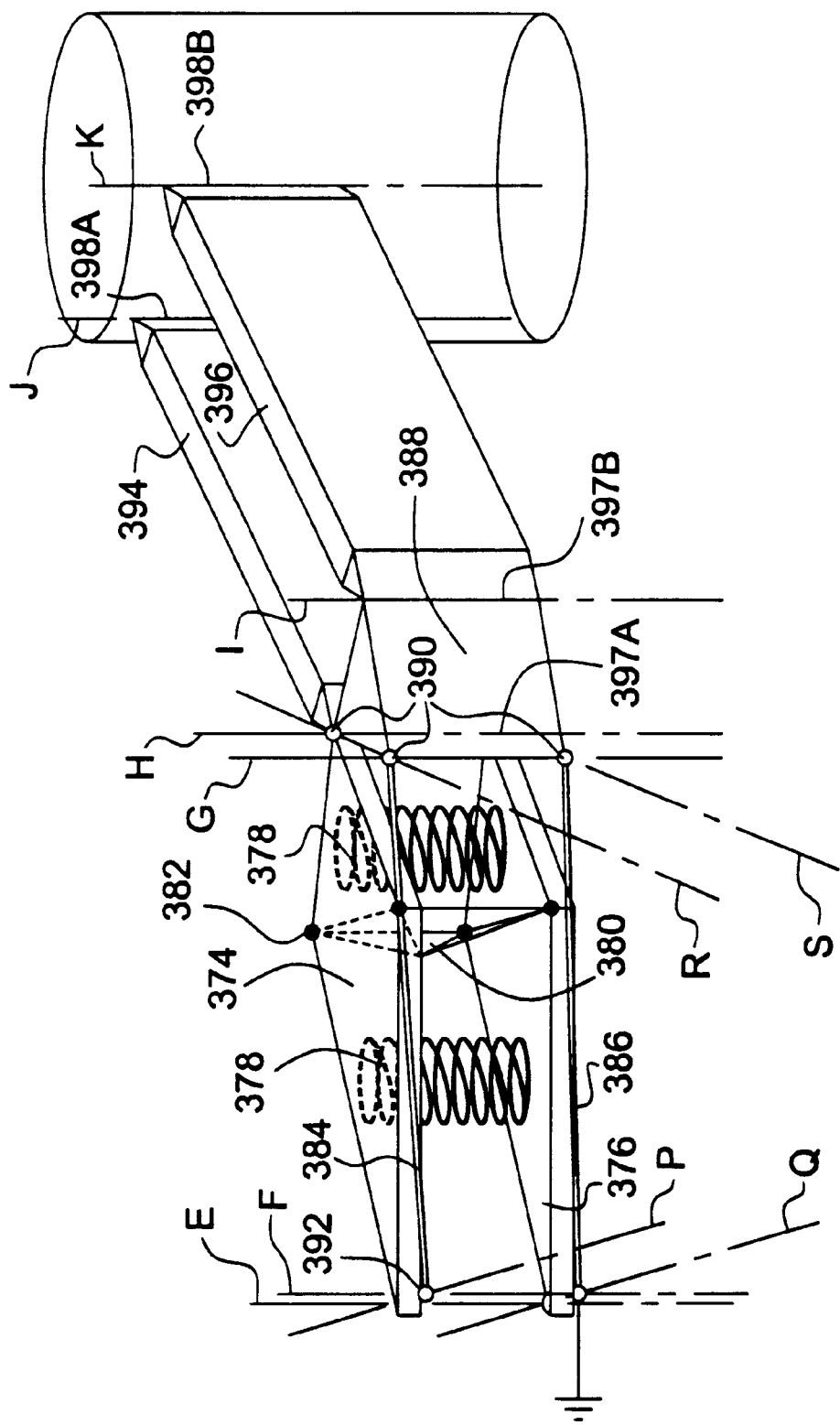
FIG. 12 is a perspective view of an alternative to the embodiments of FIGS. 9 to 11.

Referring now to FIG. 12, in an alternative to the embodiment described in FIGS. 9–11, constraint of all three rotational degrees of freedom of the spindle casing 318 is provided by an anti-rotation device which includes a linkage having upper and lower kite-shaped sub-frames 374, 376 and an intermediate, torsionally resistant pyramidal sub-frame 380, upon which upper and lower sub-frames 374, 376 are pivotally mounted at ball joints 382. Upper and lower sub-frames 374, 376 may be pivotally mounted upon ball joints 392, provided on the mechanical earth, or fixed structure, the tension springs 378 enabling easy "snap-on" mounting. Also mounted to the mechanical earth or fixed structure are a pair of elongate substantially rigid struts 384, 386; the ends of the sub-frames 374, 376 and the struts 384, 386, distal to the mechanical earth are universally pivotally mounted, via ball joints 390, to an intermediate linkage member 388. The intermediate linkage member 388 is connected to the spindle casing 318 via two rigid door members 394, 396, each of which is mounted, via hinges, 397A, B and 398A, B to the intermediate linkage member 388 and spindle casing 318, respectively. In use, translational movement of the spindle casing 318 is permitted in the XY plane by pivoting of the various elements of the constraint about hinges illustrated with the reference numerals E, F, G, H, I, J, K while translation of the spindle 318 in the Z direction is provided by pivoting of sub-frame 374, 376 and linkages 384, 386 about hinges illustrated by the reference numerals P, Q, R, S.

Figure 13:
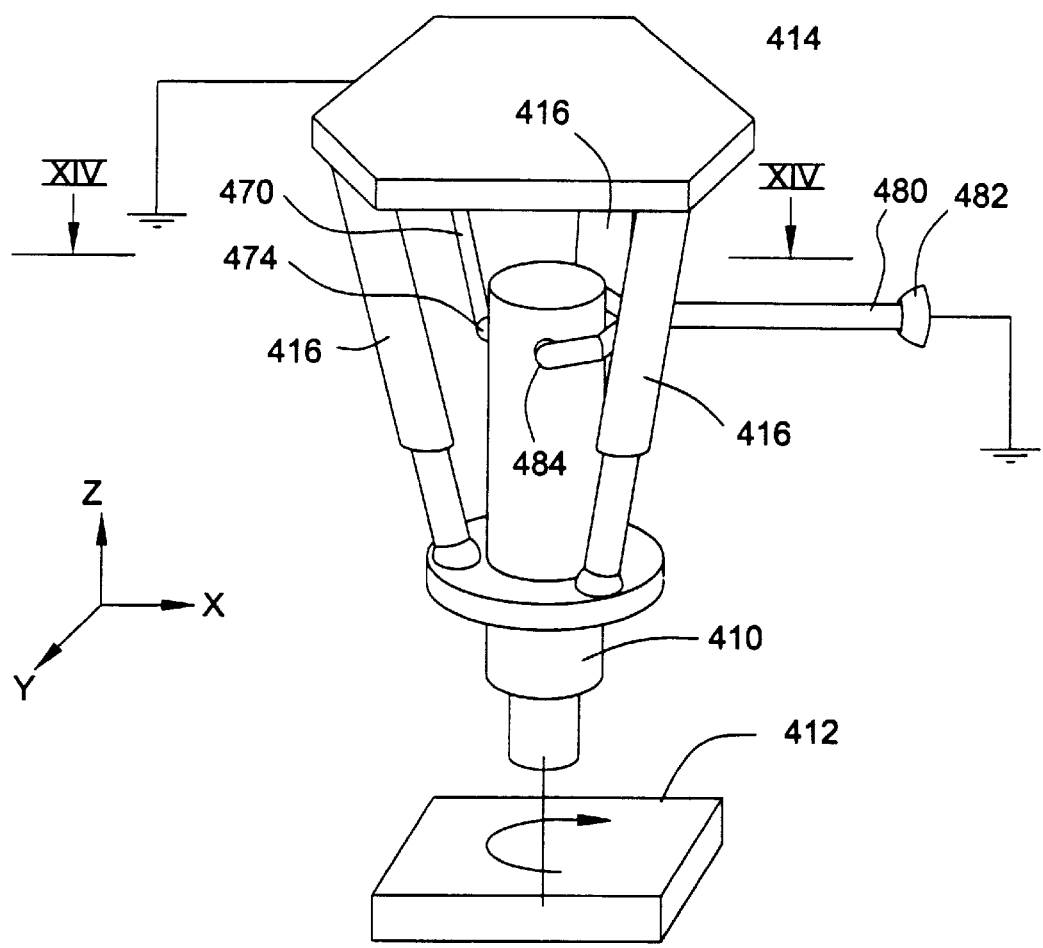
FIG. 13 is a perspective view of a fifth embodiment of the present invention.
Figure 14:
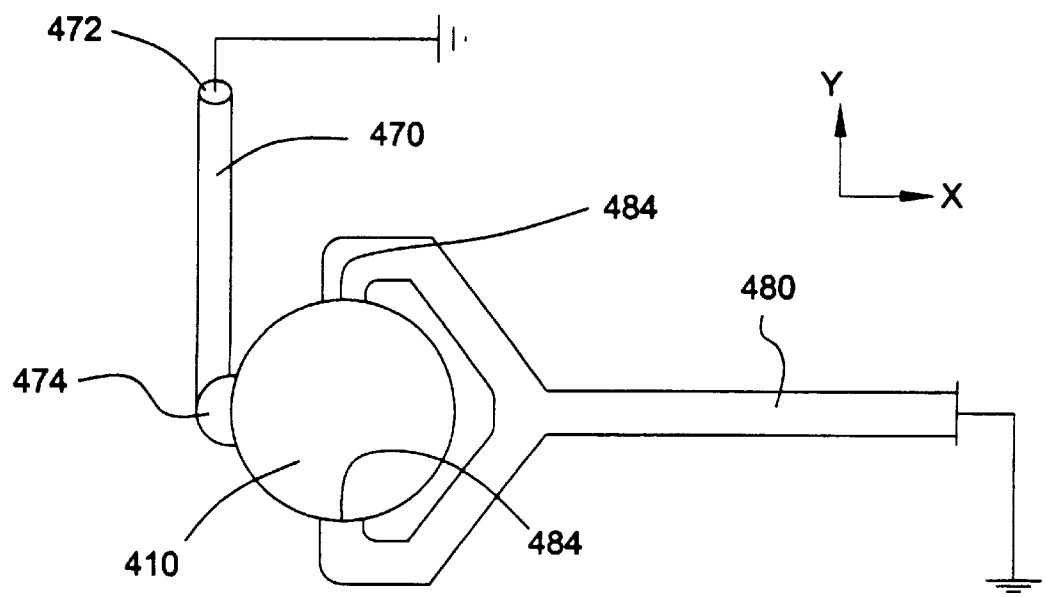
FIG. 14 is a plan view on XII—XII in FIG. 11.

A fifth embodiment of the present invention will now be described with reference to FIGS. 13–14. The machine of FIG. 13 has a movable arm 410, table 412, fixed supporting structure 414, and three powered telescopic struts 416, universally pivotally connected at their ends to the supporting structure 414 and the arm 410.

Rotation of the arm 410 about the Z axis is eliminated, and rotation about the X and Y axis is constrained to within predetermined limits by means of motion control linkages 470, 480. Motion control linkage 470 is connected at one end to a mechanical earth, and at the other to the arm 410, by means of ball joints 472, 474 respectively. Motion control linkage 480 has the form of a fork which extends at right angles to motion control linkage 470, and is universally pivotally connected at one end to a mechanical earth by a ball joint 482, and at the other to diametrically opposing sides of the arm 410 by means of bearings 484. (In an alternative embodiment, ball joints may be used).

For a given static setting of telescopic struts 416, motion control struts 470, 480 prevent rotation of the spindle 410. Upon actuation of one or more of the telescopic struts 416, the free end of the arm 410 may be positioned in a desired location by a combination of translation of the arm 410, together with arcuate movement thereof as a result of the action of motion control struts 470, 480. For example, simultaneous expansion or contraction of the telescopic struts 416 will result in linear movement of the arm 410 in the Z direction, in combination with an arcuate movement of the upper and lower ends of the arm 410, resulting from the consequential pivoting of motion control struts 470, 480. Similarly, movement of the telescopic struts 416 to translate the arm 410 in the X direction will additionally result in rotation of the arm 410 about an axis parallel to the Y axis, at a point defined by the position of the ball joint 474 and bearings 484; movement of the telescopic struts 416 to execute a translation of the arm 410 in the Y direction will result additionally in an arcuate pivoting of the arm 410 about an axis parallel to the X axis and a point defined by ball joint 474 and bearings 484.

Because translational movement of the arm 410 will inevitably result in a change in the orientation of its free end, a two axis robot-wrist will preferably be mounted upon the arm 410, and more preferably a three-axis wrist; this enabling machining of a part at a plurality of angles and orientations.

Machines actuated by three telescopic struts are easier to control than prior art machines with six struts. This is because the mathematics involved in controlling the motion of the movable arm is simpler. In particular, the algorithms required to determine the position of the arms are now based only upon three linear measurements, rather than six.

What is claimed is:

1. A coordinate positioning machine, comprising:
   a fixed structure;
   a moveable structure which is moveable relative to the fixed structure, and upon which an operating module may be mounted; and a constraining device that eliminates at least two degrees of rotational freedom of the moveable structure relative to the fixed structure, wherein translational movement of the moveable structure is actuated by three powered extensible and retractable struts, each of the struts having a length defined by a distance between a first pivotal mount which connects the strut to the moveable structure and a second pivotal mount which connects the strut to the fixed structure, both the first and second mounts permitting pivoting motion of the strut relative to the moveable or fixed structure respectively with three degrees of rotational freedom, wherein the translational movement is actuated by a change in the length of at least one of the struts.

2. A coordinate positioning machine according to claim 1, wherein the constraining device includes at least one mechanical linkage connected at one end to the fixed structure and at another end to the moveable structure.

3. A coordinate positioning machine according to claim 2, wherein the constraining device comprises two mechanical linkages and eliminates all three degrees of rotational freedom of the moveable structure relative to the fixed structure.

4. A coordinate positioning machine according to claim 2, wherein the constraining device comprises three mechanical linkages, and eliminates three degrees of rotational freedom of the moveable structure relative to the fixed structure.

5. A coordinate positioning machine according to claim 1, further comprising three transducers for measuring displacement of the moveable structure relative to the fixed structure, each of the transducers acting directly between the fixed structure and the moveable structure.

6. A coordinate positioning machine according to claim 5, wherein the transducers are independent of the struts.

7. A coordinate positioning machine, comprising:
first and second relatively moveable structures interconnected by three extensible and retractable struts;
each of the struts being connected to the first and second structures by first and second pivotal mounting respectively;
the mounting enabling pivoting motion of the struts relative to the structures with at least two degrees of rotational freedom; and
a passive constraint that passively eliminates at least two degrees of rotational freedom of the first structure relative to the second structure, wherein each of the struts has a length defined by a distance between the respective first and second pivotal mounting, and wherein relative translational motion of the first and second structures is actuated by a change in length of one or more of the struts.

8. A coordinate positioning machine according to claim 7 wherein the passive constraint comprises at least one mechanical linkage connected at one end to the first structure, and at another end to the second structure.

9. A coordinate positioning machine according to claim 8, further comprising two mechanical linkages connected at one end to the first structure and at the other end to the second structure, the two linkages cooperating to constrain all three degrees of rotational freedom of the it structure relative to the second structure.

10. A coordinate positioning machine according to claim 8, further comprising three mechanical linkages connected at one end to the first structure and at the other end to the second structure, the linkages cooperating to constrain three degrees of rotational freedom of the first structure relative to the second structure.

11. A coordinate positioning machine according to claim 7, wherein the first and second pivotal mounting enable motion of the struts relative to the first and second structures respectively with three degrees of rotational freedom.

12. A coordinate positioning machine, comprising:
first and second relatively moveable structures interconnected by three extensible and retractable struts;
each of the struts being connected to the first and second structures by first and second pivotal mounting respectively, the mounting enabling pivoting motion of the struts relative to the structures with at least two degrees of rotational freedom; and
a constraining device that eliminates at least two degrees of rotational freedom of the first structure relative to the second structure, wherein each of the struts has a length defined by a distance between the respective first and second pivotal mounting, and wherein relative translational motion of the first and second structures is actuated by a change in length of one or more of the stuts.

13. A coordinate positioning machine according to claim 12, wherein the constraining device comprises at least one mechanical linkage connected at one end to the first structure and at the other end to the second structure.

14. A coordinate positioning machine according to claim 13, wherein the constraining device comprises two mechanical linkages, and constrains three degrees of rotational freedom of the first structure relative to the second structure.

15. A coordinate positioning machine, comprising:
first and second relatively moveable structures interconnected by three extensible and retractable struts;
each of the struts being connected to the first and second structures by first and second pivotal mounting respectively;
the mounting enabling pivoting motion of the struts relative to the structures with at least two degrees of rotational freedom; and
a passive constraint that passively constrains all three degrees of rotational freedom of the first structure relative to the second structure, comprising two mechanical linkages connected at one end to the first structure and at the other end to the second structure, the two linkages cooperating to constrain said three degrees of rotational freedom of the first structure relative to the second structure,
wherein each of the struts has a length defined by a distance between the respective first and second pivotal mounting, and wherein relative translational motion of the first and second structures is actuated by a change in length of one or more of the struts.

16. A coordinate positioning machine, comprising:
first and second relatively moveable structures interconnected by three extensible and retractable struts;
each of the struts being connected to the first and second structures by first and second pivotal mounting respectively;
the mounting enabling pivoting motion of the struts relative to the structures with at least two degrees of rotational freedom; and a passive constraint system that passively constrains all three degrees of rotational freedom of the first structure relative to the second structure, comprising three mechanical linkages connected at one end to the first structure and at the other end to the second structure, the three linkages cooperating to constrain said three degrees of rotational freedom of the first structure relative to the second structure, wherein each of the struts has a length defined by a distance between the respective first and second pivotal mounting, and wherein relative translational motion of the first and second structures is actuated by a change in length of one or more of the struts.

* * * * *